United States Patent [19]
Hitomi

[11] Patent Number: 5,890,668
[45] Date of Patent: *Apr. 6, 1999

[54] SPINNING REEL HAVING A ROLLER-TYPE ONE-WAY CLUTCH

[75] Inventor: Yasuhiro Hitomi, Wakayama-ken, Japan

[73] Assignee: Shimano Inc., Sakai, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 716,366

[22] PCT Filed: Jan. 31, 1996

[86] PCT No.: PCT/JP96/00216

§ 371 Date: Sep. 19, 1996

§ 102(e) Date: Sep. 19, 1996

[87] PCT Pub. No.: WO96/23406

PCT Pub. Date: Aug. 8, 1996

Related U.S. Application Data

[63] Continuation of Ser. No. 716,366, Sep. 19, 1996, Pat. No. 5,890,668.

[30] Foreign Application Priority Data

Feb. 2, 1995 [JP] Japan ................................. 7-016225

[51] Int. Cl.⁶ .................................................. A01K 89/01
[52] U.S. Cl. ........................... 242/241; 242/230; 242/311
[58] Field of Search ................................. 242/230, 311, 242/316, 241, 246, 297, 298; 192/45

[56] References Cited

U.S. PATENT DOCUMENTS

| | | | |
|---|---|---|---|
| 4,346,857 | 8/1982 | Moll | 192/45 X |
| 4,416,428 | 11/1983 | Noda | 242/241 |
| 4,427,162 | 1/1984 | Noda | 242/241 |
| 5,020,738 | 6/1991 | Yamaguchi | 242/298 |
| 5,156,246 | 10/1992 | Iga et al. | 192/45 |
| 5,232,181 | 8/1993 | Fujine | 242/241 |
| 5,308,017 | 5/1994 | Yoshikawa | 242/241 |
| 5,411,218 | 5/1995 | Uehara et al. | 242/246 X |
| 5,427,324 | 6/1995 | Kawashiro | 242/241 |
| 5,443,571 | 8/1995 | Kang | 242/311 |

FOREIGN PATENT DOCUMENTS

| | | |
|---|---|---|
| 0054425 | 6/1982 | European Pat. Off. . |
| 0689765 | 1/1996 | European Pat. Off. . |
| 5-82279 | 11/1993 | Japan . |
| 6-5466 | 1/1994 | Japan . |
| 252487 | 1/1948 | Switzerland . |

*Primary Examiner*—Donald P. Walsh
*Assistant Examiner*—Emmanuel M. Marcelo
*Attorney, Agent, or Firm*—Shinjyu An Intellectual Property Firm

[57] ABSTRACT

A spinning reel includes a reel main body having a rod attachment portion, a handle shaft rotatably supported by the reel main body, a spool, a rotor, a rotor shaft, a pinion gear, a face gear, and a reciprocating mechanism. The face gear includes a disc portion and an annular ring portion axially extending from the disc portion. The annular ring portion includes gear teeth disposed on an axial surface of the annular ring portion. The pinion gear is disposed on the rotor shaft, and engages the face gear and is coupled to the rotor. The reciprocating mechanism includes a screw shaft which is rotated by the pinion gear. The distance between the axial center of the face gear and an attachment face of the rod attachment portion is set to be no more than 85 mm, and an outer diameter of the face gear is no less than 40% of this distance. An inner diameter of the face gear is no less than four times the distance between the axial center of the pinion gear and the axial center of the face gear.

9 Claims, 6 Drawing Sheets

FIG. 9

| | Comparative Example 1 | Example 1 | Reference Example 1 |
|---|---|---|---|
| Gear Angle (°) | 54.00 | 45.00 | 40.00 |
| Module m | 0.68 | 0.72 | 0.88 |
| Offset (mm) | 6.50 | 6.50 | 8.00 |
| No. of Teeth on Face Gear | 31 | 36 | 40 |
| No. of Teeth on Pinion Gear | 6 | 7 | 9 |
| Gear Ratio | 5.17 | 5.14 | 4.44 |
| Distance D (mm) | 27.20 | 32.00 | 45.00 |
| Distance d (mm) | 22.70 | 27.50 | 37.00 |
| Distance L (mm) | 72.00 | 72.00 | 90.50 |
| D/L Ratio (%) | 37.78 | 44.44 | 49.72 |
| d/E Ratio | 3.49 | 4.23 | 4.63 |
| Evaluation | Poor | Good | Good |

SPINNING REEL HAVING A ROLLER-TYPE ONE-WAY CLUTCH

This application is a continuation of Ser. No. 08/716,366 filed Sept. 19, 1996, now U.S. Pat. No. 5,890,668.

BACKGROUND OF THE INVENTION

1. Field of the Invention

The present invention relates to a spinning reel, and more particularly to a spinning reel having a screw shaft for reciprocating a spool disposed on the spinning reel.

2. Description of the Related Art

A spinning reel typically includes a reel main body, a rotor rotatably supported by the reel main body, and a spool supported by the reel main body. Fishing line is wound around the outer periphery of the spool.

The reel main body is equipped with a handle and a handle shaft, with a face gear fixed to the handle shaft. The face gear is meshed with a pinion gear, with an end portion of the pinion gear fixed to the rotor. An intermediate gear is fitted to an end portion of the screw shaft and is meshed with the pinion gear. An end portion of the pinion gear is supported by a bearing portion and is disposed within the circumference of the face gear. A slider is engaged with a spool shaft, and the screw shaft moves the slider along the screw shaft, thereby reciprocating the spool and the spool shaft.

The rotor includes a pair of bail supporting arm portions, with a bail and a line roller for guiding the fishing line around the outer periphery of the spool being disposed between both the bail supporting arm portions.

With this type of spinning reel, when the handle is rotated by the user, the rotor spins around the periphery of the spool and the spool reciprocates, thereby allowing the fishing line to be uniformly wound around the outer periphery of the spool.

The type of spool reciprocating mechanism described above allows the range of reciprocal motion of the spool to be increased without increasing the diameter of the face gear or the overall size of the reel body. However, when the diameter of the face gear is small, the gear ratio is such that operation of the handle is often not optimal. In other words, a spinning reel with a smaller face gear requires the user to apply more force to spin the rotor than a spinning reel with a larger face gear.

It is desirable for an end portion of the pinion gear to be supported by a ball bearing mechanism, so that the force needed to spin the rotor could be reduced. However a small face gear does not provide sufficient space for a ball bearing mechanism to be disposed at the end portion of the pinion gear adjacent to the face gear.

SUMMARY OF THE INVENTION

It is therefore an object of the present invention to reduce the force needed to operate a spinning reel by enhancing the efficiency of its rotor mechanism.

Another object of the present invention is to provide sufficient space within a spinning reel to allow an end portion of a pinion gear to be supported with a ball bearing mechanism.

According to one aspect of the present invention, a spinning reel includes a reel main body, a rod attachment portion for attaching the spinning reel to a fishing rod, a handle shaft rotatably supported by the reel main body, a spool shaft supported in the reel main body, a rotor shaft, a rotor, a face gear, a pinion gear, and a reciprocating mechanism. The face gear includes a disc portion fixed to the handle shaft and an annular ring portion formed on an axial face of the disc portion. The annular ring portion includes gear teeth disposed on an axial surface of the annular ring portion. An annular recess is defined by the inner edges of the annular ring portion disposed on the face gear. The rotor shaft includes a pinion gear formed thereon, and the pinion gear engages the face gear. The rotor shaft is rotatably supported in the reel main body generally perpendicular to the handle shaft. The rotor is rotatably supported by the rotor shaft and guides the fishing line around the outer periphery of the spool. The distance between the axial center of the handle shaft and the center of a rod attachment face connected to the rod attachment portion is less than or equal to 85 mm., and the outer diameter of the face gear is equal to or greater than 40% of this distance.

According to another aspect of the present invention, a spool is supported on the spool shaft and the reciprocating mechanism is connected to the spool shaft and includes a screw shaft which is rotated by the pinion gear in order to reciprocate the spool.

According to yet another aspect of the present invention, an inner diameter of the face gear is less than or equal to four times the distance between the axial center of the pinion gear and the axial center of the face gear.

According to yet another aspect of the present invention, the pinion gear is supported by a ball bearing mechanism disposed on an end portion of the pinion gear.

According to another aspect of the present invention, the ball bearing mechanism disposed on an end of the pinion gear is at least partially extends into the annular recess.

According to another aspect of the present invention, the rotor shaft is generally cylindrical and hollow, and the spool shaft extends through the rotor shaft.

Other objects, features, aspects and advantages of the present invention will be apparent from the following detailed description of the present invention when taken in conjunction with the accompanying drawings, in which like reference numerals designate the same or similar parts throughout.

BRIEF DESCRIPTION OF THE DRAWINGS

FIG. 9 is a table showing experimental data for various embodiments of a spinning reel.

DETAILED DESCRIPTION OF THE PREFERRED EMBODIMENTS

Figure 1:
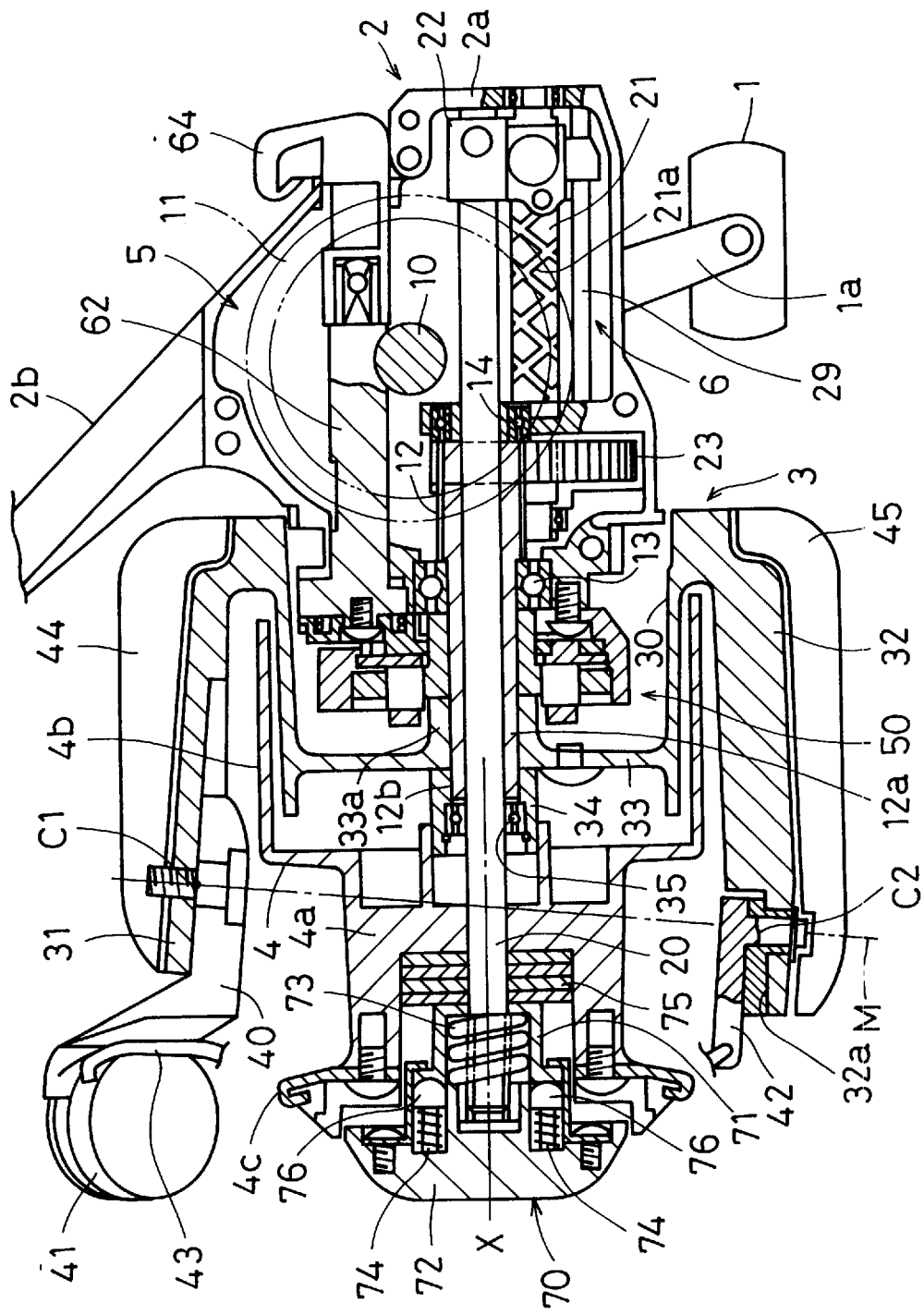
FIG. 1 is a fragmentary, part section, part elevation of a spinning reel having a reel main body and a rotor according to one embodiment of the present invention.
Figure 2:
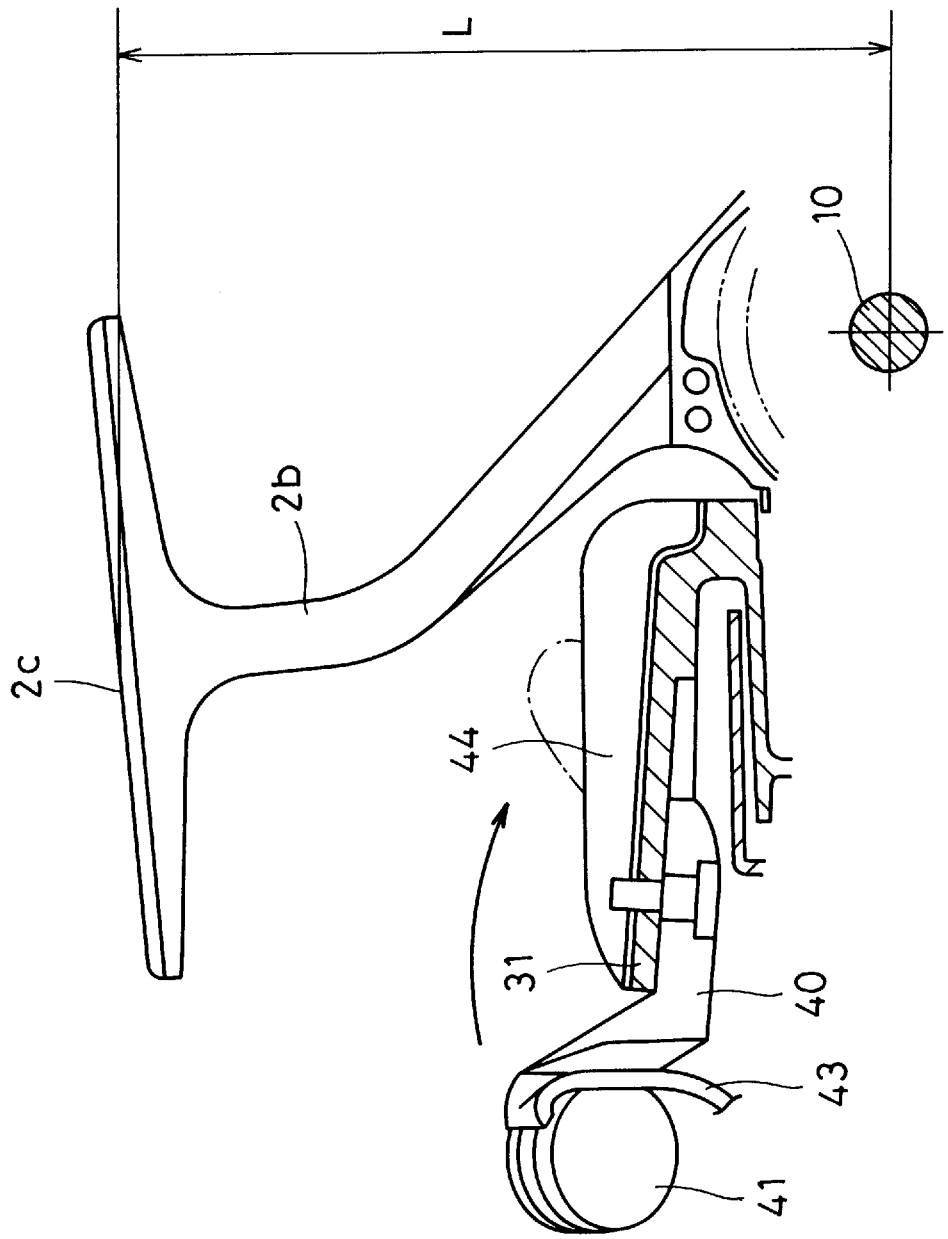
FIG. 2 is a fragmentary, part section, part elevation of a portion of the spinning reel depicted in FIG. 1.

A spinning reel according to one aspect of the present invention is shown in FIG. 1, and includes a reel main body 2, a body 2a, a rotor 3 rotatably supported by the reel main body 2, and a spool 4 supported by the reel main body 2 on a spool shaft 20. A rotor drive mechanism 5 and a reciprocating mechanism 6 are disposed in the interior of the body 2a. As is described in greater detail below, the rotor drive mechanism 5 is geared to cause the rotor 3 to rotate, and the reciprocating mechanism 6 engages the spool 4 causing it to reciprocate along a first axial line X, thus allowing fishing line to be wound around the outer periphery of the spool. A handle shaft 10 is rotatably supported by the reel main body 2. A handle 1 includes a first end portion 1a and a second end portion (not shown), with the second end portion being attachable to either end portions of handle shaft 10. An attachment portion 2b is formed on the body 2a for attaching the spinning reel to a fishing rod (not shown). As shown in FIG. 2, an attachment face 2c is formed on a first end portion of the attachment portion 2b.

Figure 4:
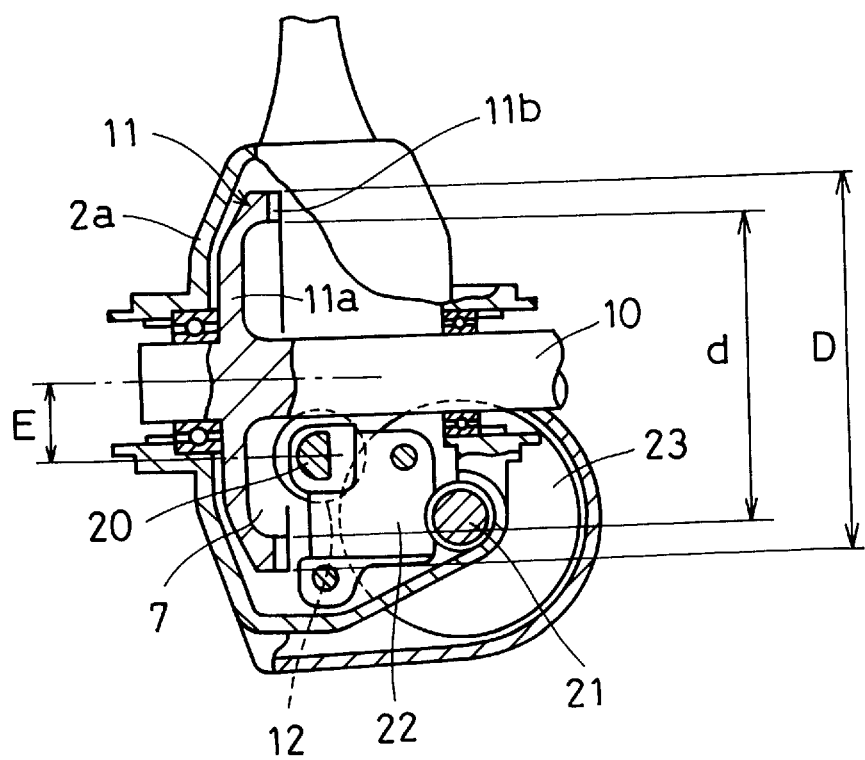
FIG. 4 is a fragmentary, part section, part elevation of the spinning reel depicted in FIG. 1.

Referring now to FIGS. 1 and 4, the rotor drive mechanism 5 includes a face gear 11 that is connected to and rotates together with the handle shaft 10, and a pinion gear 12 which engages with the face gear 11. The face gear 11 includes a disc portion 11a and an annular ring portion 11b axially extending from the disc portion 11a. Gear teeth are formed on an axial face of the annular ring portion 11b. The inner edges of the annular ring portion 11b define a space hereinafter referred to as an annular recess 7. The outer diameter of face gear 11 is defined as a first diameter D, and the inner diameter of the annular ring portion 11b is defined as a second diameter d.

Figure 3:
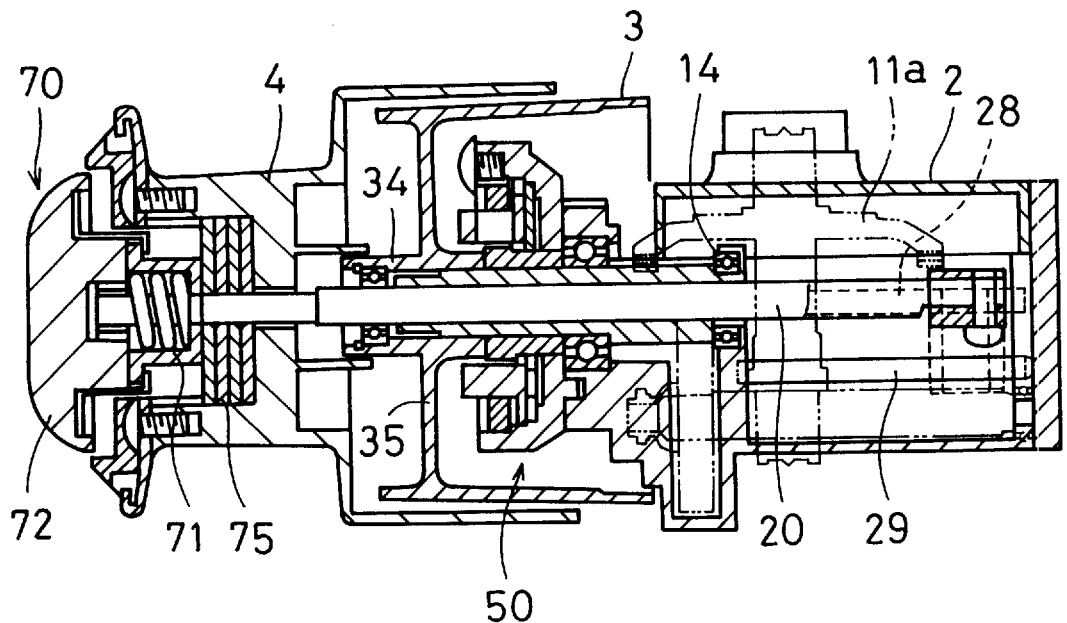
FIG. 3 is a part section, part elevation of the spinning reel depicted in FIG. 1.

As can be seen in FIG. 1, the pinion gear 12 is hollow and cylindrical in shape and defines a rotor shaft, and a first end portion 12a thereof is connected to and extends through the rotor 3. The portion of the first end portion 12a that extends through the rotor 3 is provided with a threaded portion 12b. As can be seen in FIG. 4, the distance between the axial center of pinion gear 12 and the axial center of the face gear 11 is defined as a third distance E. As shown in FIG. 1, the pinion gear 12 is rotatably supported by the reel main body 2 via a first ball bearing assembly 13 disposed on an intermediate portion thereof and a second ball bearing assembly 14 disposed on a second end portion thereof. As shown in FIGS. 3 and 4, a portion of the second ball bearing assembly 14 extends into the annular recess 7.

In the embodiment of the present invention shown in FIGS. 1, 3 and 4, the ratio between the second diameter d to the third distance E is set to 4.23. It is preferable to set the ratio d/E to 4.0 or more. When the ratio d/E is less than 4.0, it is difficult to provide sufficient space to support the second end portion of the pinion gear 12 with a ball bearing mechanism.

The reciprocating mechanism 6 is a mechanism for reciprocating the spool 4 and the spool shaft 20 along an axial line X. As shown in FIGS. 1 and 4, the reciprocating mechanism 6 includes a screw shaft 21 disposed adjacent to and parallel with the spool shaft 20, a slider 22 that reciprocates along the screw shaft 21, and an intermediate gear 23 fixed to a first end portion of the screw shaft 21 and meshed with the pinion gear 12. The screw shaft 21 is rotatably supported by the body 2a. A spiral groove 21a is formed on the outer periphery of the screw shaft 21. The slider 22 is fixed to a first end portion of the spool shaft 20.

Figure 5:
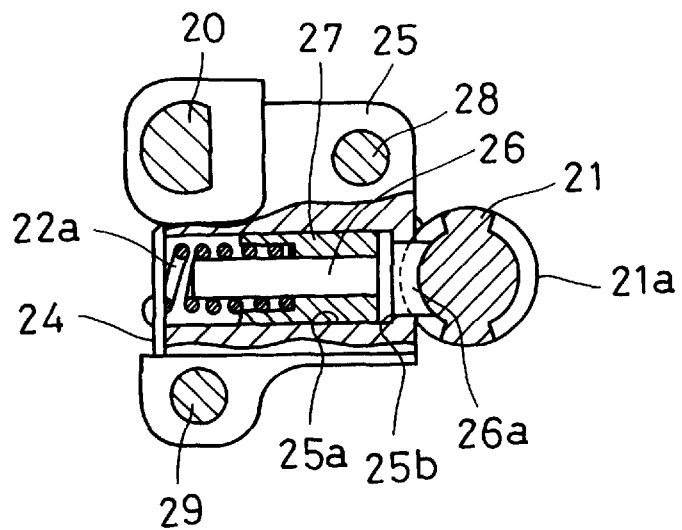
FIG. 5 is a part section, part elevation showing a slider and screw shaft removed from the main reel body of the spinning reel of FIG. 1.

As shown in FIGS. 4 and 5, the slider 22 includes a slider main body 25, and an engagement member 26 disposed within the slider main body 25. The slider main body 25 is slidable on a first guide shaft 28 and a second guide shaft 29, both guide shafts being disposed adjacent to and in parallel with the spool shaft 20. A hole 25a is formed in the slider main body 25 so as to be orthogonal to the screw shaft 21, and the engagement member 26 is slidably inserted into the hole 25a. An engagement portion 26a is formed on a first end of the engagement member 26 and is engaged with the groove 21a on the screw shaft 21. A step portion 25b is formed in the hole 25a and prevents the engagement portion 26a from protruding too far out of the slider main body 25 toward the screw shaft 21. The engagement member 26 is inserted into the interior portion of a spring 22a and a support cylinder 27. A cap member 24 is fixed onto the slider main body 25 in order to cap one end of the hole 25a.

The spring 22a and the support cylinder 27 serve to urge engagement member 26 toward the screw shaft 21. Since the step portion 25b limits the amount that the engagement portion 26a may travel toward the side of the screw shaft 21, the lead end of the engagement portion 26a will not contact the bottom portion of the groove 21a on the screw shaft 21. This has the effect of reducing frictional resistance between the engagement portion 26a and the screw shaft 21, and reduces the amount of unwanted noise or vibrations during reel operation.

As can be seen in FIG. 1, the rotor 3 includes a generally cylindrical portion 30, a first arm portion 31 and a second arm portion 32. The cylindrical portion 30 and both first and second arm portions 31 and 32 are formed integral with each other, with the first and second arm portions 31 and 32 being disposed on the outer portion of the cylindrical portion 30 and in a generally opposing relationship.

A wall 33 is formed on a first end of the cylindrical portion 30, and a boss 33a is formed in the center of the wall 33. A through-hole is formed in the center of the boss 33a, and both the first end portion 12a of the pinion gear 12 and the spool shaft 20 penetrate the through-hole. A nut 34 is disposed on the outer portion of cylindrical portion 30 and aligned with the through-hole formed therein. A first end portion of the nut 34 is screwed together with the threaded portion 12b of the first end portion 12a of the pinion gear 12, thereby securing the rotor 3 to the pinion gear 12. A third ball bearing assembly 35 is disposed around the inner periphery of the nut 34 and rotatably supports the spool shaft 20.

A reverse rotation prevention mechanism 50 is disposed on the body 2a and located within the interior of the cylindrical portion 30. The reverse rotation preventing mechanism 50 allows the user to prevent the reverse rotation of the rotor 3 and includes a roller-type one-way clutch and an operating mechanism for operating the one-way clutch. The operating mechanism includes an operation rod 62 and an operation lever 64 connected to first end of the operation rod 62. When the user desires to prevent the reverse rotation of the rotor 3, he or she may move the operation lever 64 to engage the one-way clutch with the pinion gear 12, thereby allowing the pinion gear to rotate in only one direction.

A first bail support member 40 is pivotably attached to the inner peripheral side of the first arm portion 31. A line roller 41 is disposed on a first end of the first bail support member 40 in order to guide the fishing line around the spool 4. A second bail support member 42 is disposed on the inner peripheral side of the second arm portion 32. A bail 43 is disposed between the line roller 41 on the first bail support member 40 and the second bail support member 42. First cover 44 and second cover 45 are fitted onto the outer periphery of the first and second arm portions 31 and 32. The surfaces of the first and second covers 44 and 45 are contoured, thereby preventing the fishing line from being snagged and damaged thereon.

By positioning the first bail support member 40 on the inner peripheral side of the first arm portion 31, the amount of clearance between the first bail support member 40 and the attachment face 2c during reel operation is maximized while downsizing the size of the spinning reel as a whole. This also allows a person using the spinning reel to place his or her hand in the vicinity of the attachment portion 2b and not have the first bail support member 40 come into contact with his or her hand during reeling.

In the embodiment of the present invention shown in FIG. 1, both the bail support members 40 and 42 are pivotable about a second axial line M, with the first bail support member 40 pivoting about a point C1 and second bail support member 42 pivoting about a point C2. The second axial line M is inclined with respect to the first axial line X. In addition, the outer portions of first and second bail support members 40 and 42 adjacent to the inner portions of first and second arm portions 31 and 32 lie in a plane orthogonal to the second axial line M.

Figure 6:
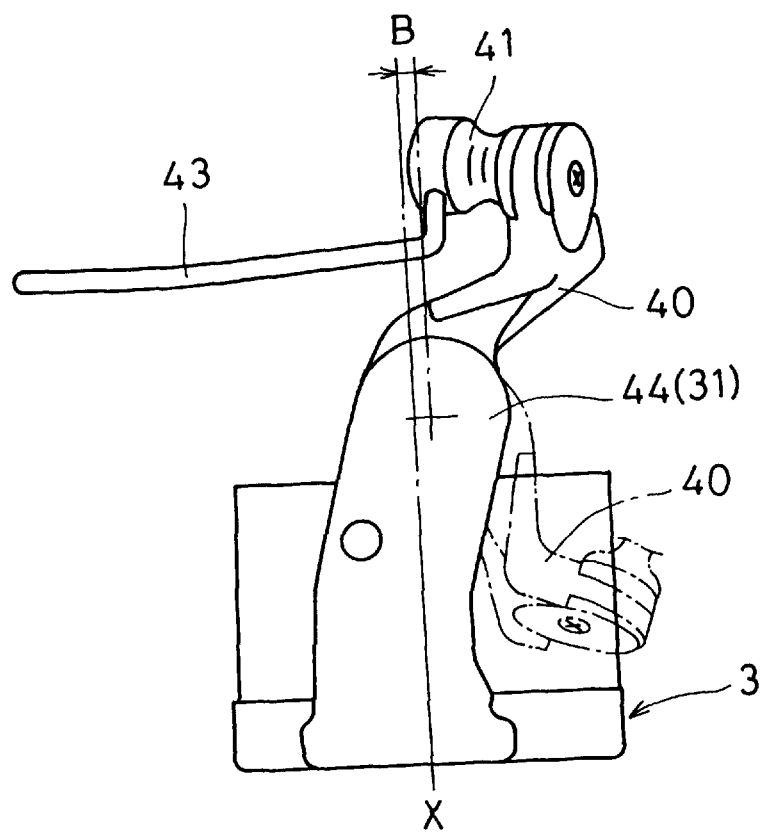
FIG. 6 is a side view of the rotor shown removed from the main reel body of the spinning reel of FIG. 1.
Figure 7:
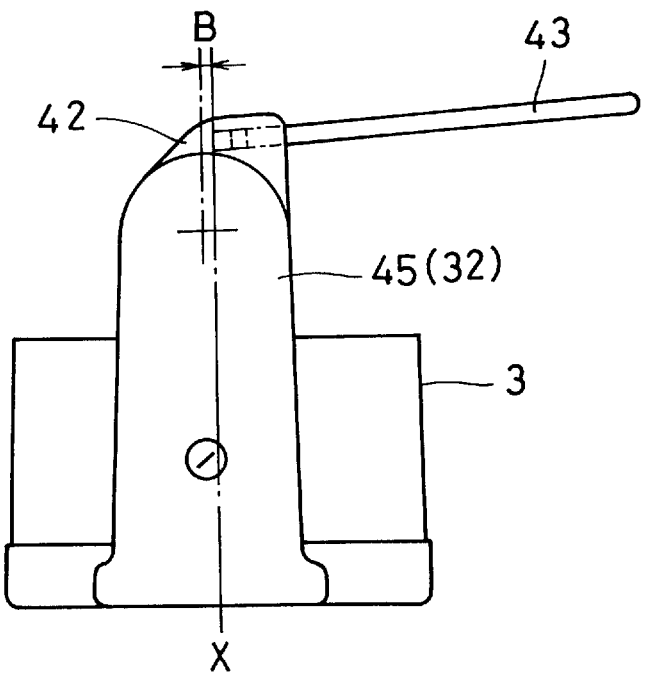
FIG. 7 is a side view of the rotor depicted in FIG. 6, showing the opposite side of the rotor 180° from that depicted in FIG. 6.

As can be seen in FIGS. 6 and 7, the first arm portion 31 is inclined with respect to the first axial line X when configured in the line winding position. Inclining the first arm portion 31 in such a manner prevents the bail 43 from coming into contact with the first arm portion 31 when the bail 43 is brought down to the line release position (indicated by a dashed line in FIG. 6) and balances the distribution of mass around the rotor when the bail 43 is configured in the line winding position, thereby allowing the smooth rotation of the rotor 3. In contrast, the second arm portion 32 extends substantially parallel with the first axial line X, as shown in FIG. 7. In addition, the pivot points C1 and C2 are offset slightly from the first axial line X by a fourth distance B. This configuration also balances the distribution of mass around the rotor when the bail 43 is configured in the line winding position, thereby allowing the smooth rotation of the rotor 3.

As shown in FIGS. 1 and 3, the spool 4 is connected to a second end portion of the spool shaft 20 through a drag mechanism 70, and between the first arm portion 31 and the second arm portion 32. The spool 4 includes a spool body 4a on the outer periphery of which a fishing line is wound, a skirt portion 4b integrally formed with the spool body 4a on a first end portion thereof and partially surrounding the cylindrical portion 30 of rotor 3, and a flange plate 4c fixed to a second end portion of the spool body 4a. The flange plate 4c is preferably formed of a stainless plate material and is preferably attached onto the spool body 4a by screws, although any other comparable material or attachment means will suffice.

The drag mechanism 70 includes a pushing member 71, an adjustment thumbscrew 72, a pushing spring 73 disposed between the pushing member 71 and the adjustment thumbscrew 72, and a plurality of clutch plates 75 disposed between the pushing member 71 and the spool 4. Drag mechanism 70 allows the user to adjust the amount drag force by twisting the adjustment thumbscrew 72. This has the effect of increasing or decreasing the amount of pressure on the pushing spring 73. The pressure applied by the pushing spring 73 is transmitted to the clutch plates 73 through the pushing member 71.

Figure 8:
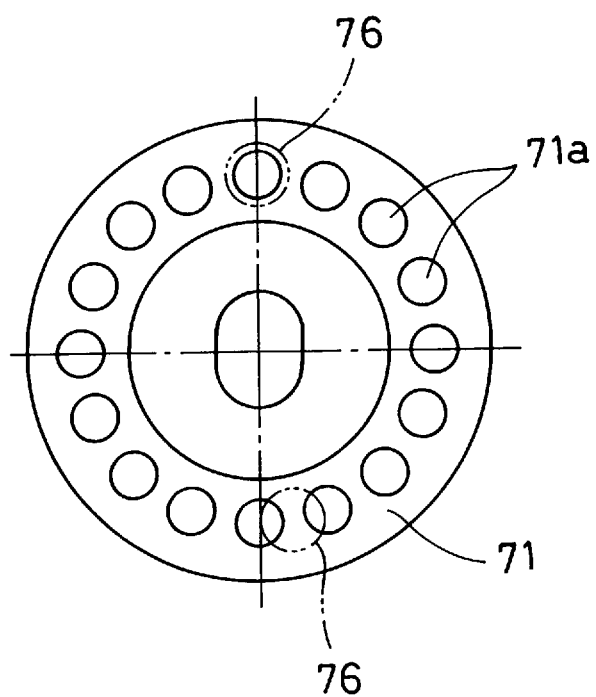
FIG. 8 is an elevation of a portion of a click sound generating mechanism of the spinning reel depicted in FIG. 1, shown removed from the spinning reel.

In addition, the drag mechanism 70 is equipped with a click sound generating mechanism. As can be seen in FIGS. 1 and 8, this mechanism includes a plurality of grooves 71a formed in a first end portion of the pushing member 71, at least two pins 76 slidably disposed on the adjustment thumbscrew 72 along the axial direction, and at least two pin springs 74 for urging the pins 76 toward the grooves 71a. The plurality of grooves 71a are formed at predetermined pitches, and pins 76 are disposed in such a manner that when one pin 76 is disposed in a groove 71a, another pin 76 is disposed between the other grooves 71a. With this type of click sound generating mechanism, the user may judge the amount of change in drag force desired when rotating the adjustment thumbscrew 72. In addition, by adding additional grooves 71a and adjusting the position of the pins 76 appropriately, it is possible to provide the user with an even better means of judging the amount of change in the drag force desired.

A fifth distance L is defined between the center of the attachment face 2c and a point on the axial center of the handle shaft 10 orthogonal to the attachment face 2c. In the embodiment of the present invention shown in FIG. 2, L is set to 72 mm, and the first diameter D is set to 32.0 mm. In other words, the ratio (D/L) between of the outer diameter of the face gear 11 (D) and the fifth distance L is 44.44%. It is preferable to set the ratio D/L to 40% or more. When the ratio D/L is less than 40%, an unacceptable amount of force is required to turn the handle 1. In addition, when the fifth distance L exceeds 85 mm, it is difficult for the user to place his or her thumb on the spinning reel while holding the fishing rod.

In another embodiment of the present invention, a grip portion of the handle 1, the operation lever 64 of the reversing rotation preventing mechanism 50, and the drag adjustment thumbscrew 72 are formed of a photoluminescent material. As a result, nighttime fishing operation is facilitated.

The operation of the spinning reel will now be described.

When the user desires to cast the fishing line, the bail 43 is pivoted to the line release position (shown partially in FIG. 6). The fishing line is then cast out, with the fishing line wound around the outer periphery of the spool 4 being drawn out.

When the user desires to wind the fishing line back onto the spool 4, the bail 43 is pivoted to the line winding position. When the handle 1 is rotated, the rotating force is transmitted through the handle shaft 10 and the face gear 11 to the pinion gear 12, thereby spinning the rotor 3. In addition, the screw shaft 21 is rotated by the intermediate gear 23 meshed with the pinion gear 12. The slider 22 is engaged with the groove 21a of the screw shaft 21 and travels along the screw shaft 21, thereby reciprocating the spool 4 along first axial line X. This reciprocating motion allows the fishing line to be uniformly wound around the outer periphery of the spool 4 by the bail 43 and the line roller 41. When the ratio D/L is set to 40% or more, the amount of force to spin the handle 1 is reduced.

FIG. 9 shows data relating to the performance evaluations of several experimental examples. The performance of various spinning reel embodiments, and particularly the force required to spin the handle and the rotor, was tested by suspending a spinning reel by its attachment portion so that its handle shaft lies generally parallel to the ground. The reverse rotation prevention device was disengaged, and the handle was then rotated until it was generally parallel to the ground and then released and allowed to swing freely. A GOOD rating was assigned to a spinning reel in which the handle, when released, swing down to the vertical position and then swung back and forth past the vertical position (in a pendulum-like manner) at least 3 to 5 times before coming to a rest at the vertical position. A POOR rating was assigned to a spinning reel in which the handle rotated past the vertical no more than 1 time.

As shown in Example 1, the ratio D/L is 44.44% and the ratio d/E is 4.23. In a spinning reel thus implemented, there will be sufficient space to support the rear end portion of the pinion gear with a ball bearing mechanism. When the spinning reel according to Example 1 was tested in accordance with the above-mentioned methodology, it was found that the spinning reel of Example 1 achieved a GOOD rating.

In the spinning reel according to Comparative Example 1, the ratio D/L was found to be 37.78 and the ratio d/E was found to be 3.49. Due to this configuration, an end portion of the pinion gear was not supported by a ball bearing mechanism and instead was supported by a bush. Upon evaluation, the spinning reel of Comparative Example 1 achieved only a POOR rating.

As can be seen in FIG. 9, Reference Example 1 also achieved a GOOD rating due to the fact that the D/L ratio was 49.72 and the d/E ratio was 4.63. These ratios, like Example 1, allowed an end portion of the pinion gear to be supported by a ball bearing mechanism. FIG. 9 also indicates that the fifth distance L was 90.5 mm., thereby exceeding the preferred length of 85 mm. However, the first and second diameters d and D of the face gear in this embodiment are relatively large, and therefore the overall size of the spinning reel will be increased. This increase in size will bring the rotor and bail member closer to the attachment face, thereby allowing the user to place his or her thumb on the spinning reel while holding the fishing rod.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A spinning reel, comprising.
   a reel main body;
   a rod attachment portion fixed to said reel main body, said rod attachment portion having an attachment face configured for engagement and attachment to a fishing rod;
   a handle shaft rotatably supported in said reel main body;
   a face gear attached to said handle shaft, said face gear formed with a disc portion and an angular ring portion axially extending from said disc portion, said annular ring portion being formed with gear teeth on an axial face thereof, and an annular recess is defined by radially inner edges of said annular ring portion;
   a rotor shaft having a pinion gear formed thereon, said pinion gear being engaged with said face gear, said rotor shaft being rotatably supported in said reel main body by a first ball bearing mechanism, said rotor shaft being generally perpendicular to said handle shaft;
   a second ball bearing mechanism disposed on an end portion of said pinion gear supporting said pinion gear, said second ball bearing mechanism being supported in said reel main body adjacent to said face gear radially inward from said angular ring portion proximate said annular recess and extending at least partially into said annular recess;
   a rotor rotatably supported on said rotor shaft;
   a spool shaft extending through a central portion of said rotor shaft, said spool shaft being configured for reciprocal movement with respect to said rotor shaft; and
   a reciprocating mechanism disposed within said reel main body spaced apart from said second ball bearing mechanism, and
   a third ball bearing mechanism disposed radially within said spool, said third ball bearing mechanism supporting said spool shaft;
   wherein a first diameter D of said face gear is equal to or greater than 40% of a first distance L between a center of said attachment face and a point on an axial center of said handle shaft orthogonal to said attachment face; and
   wherein said reciprocating mechanism including a slider supported on a guide shaft, said slider being connected to said spool shaft, said slider having a portion in contact with a screw shaft, said screw shaft configured for moving said slider in a reciprocating motion in response to rotation of said handle shaft, wherein said screw shaft, said guide shaft and said rotor shaft are non-concentric, are all generally parallel to one another and are spaced apart from one another.

2. The spinning reel as set forth in claim 1, further comprising a reverse rotation prevention mechanism supported on said reel main body adjacent to said first ball bearing mechanism, said reverse rotation prevention mechanism including a roller-type one-way clutch disposed within an interior space of said rotor.

3. A spinning reel, comprising:
   a reel main body;
   a rod attachment portion, said rod attachment portion having a first and second end portion, wherein said first end portion is attached to said reel main body and said second end portion having a rod attachment face;
   a handle shaft rotatably supported in said reel main body;
   a face gear attached to said handle shaft, said face gear including a disc portion and an angular ring portion axially extending from said disc portion, and gear teeth formed on an axial face of said annular ring portion, wherein an annular recess is defined by inner edges of said annular ring portion;
   a rotor shaft having a pinion gear formed thereon, said pinion gear being engaged with said face gear, said rotor shaft being rotatably supported in said reel main body by a first ball bearing mechanism, said rotor shaft being generally perpendicular to said handle shaft;
   a rotor rotatably supported on said rotor shaft;
   a reciprocating mechanism disposed within said reel main body for providing reciprocating movement to a spool supported on said reel main body;
   a second ball bearing mechanism disposed on an end portion of said pinion gear supporting said pinion gear, said second ball bearing mechanism being disposed adjacent to said face gear radially inward from said angular ring portion proximate said annular recess and extending at least partially into said annular recess, said second ball bearing mechanism being spaced apart from said reciprocation mechanism;
   a third ball bearing mechanism disposed radially within said spool, said third ball bearing mechanism supporting said spool;
   wherein a first diameter D of said face gear is equal to or greater than 40% of a first distance L between a center of said attachment face and a point on an axial center of said handle shaft orthogonal to said attachment face; and wherein said reciprocating mechanism including a slider supported on a guide shaft, said slider being coupled to said spool shaft, said slider having a portion in contact with a screw shaft, said screw shaft configured for moving said slider in a reciprocating motion in response to rotation of said handle shaft, wherein said screw shaft, said guide shaft and said rotor shaft are all generally parallel to one another, are non-concentric and are spaced apart from one another.

4. The spinning reel according to claim 3, further comprising a spool shaft supported in said reel main body supporting said spool.

5. The spinning reel according to claim 4, wherein said spool shaft extends from said reciprocation mechanism through a hollow interior of said rotor shaft to said spool.

6. The spinning reel according to claim 3, further comprising a reverse rotation prevention mechanism supported on said reel main body adjacent to said first ball bearing mechanism, said reverse rotation prevention mechanism including a roller-type one-way clutch disposed within an interior space of said rotor and adjacent to said first ball bearing mechanism.

7. The spinning reel according to claim 6, wherein said reciprocating mechanism includes a screw shaft rotated by said pinion gear, said screw shaft being in engagement with said spool shaft in order to reciprocate said spool.

8. The spinning reel according to claim 3, wherein a second diameter d of said face gear is less than or equal to four times a third distance E between an axial center of said pinion gear and an axial center of said face gear.

9. The spinning reel according to claim 8, wherein said first distance L is less than or equal to 85 mm.

* * * * *